United States Patent [19]

Hattori

[11] Patent Number: 5,465,183

[45] Date of Patent: Nov. 7, 1995

[54] CONTROL SYSTEM FOR POSITIONING HEAD IN DISK DEVICE BY ESTIMATING AND CORRECTING ACTUATOR PARAMETERS BASED ON HEAD POSITION AND ACTUATOR DRIVE CURRENT OBTAINED BY VIBRATING THE HEAD

[75] Inventor: Toshiro Hattori, Tokyo, Japan

[73] Assignee: NEC Corporation, Tokyo, Japan

[21] Appl. No.: 178,761

[22] Filed: Jan. 7, 1994

[30] Foreign Application Priority Data

Jan. 7, 1993 [JP] Japan ..................... 5-016943
Nov. 4, 1993 [JP] Japan ..................... 5-275701

[51] Int. Cl.$^6$ ..................... G11B 5/596; G11B 21/02
[52] U.S. Cl. ..................... 360/78.9; 360/75
[58] Field of Search ..................... 360/77.08, 77.17, 360/78.04, 78.09, 75, 78.06, 77.04; 369/44.13, 13, 32, 44.25, 44.34; 318/611, 561, 568.18, 563

[56] References Cited

U.S. PATENT DOCUMENTS

| | | | |
|---|---|---|---|
| 4,477,755 | 10/1984 | Rickert | 318/611 |
| 4,697,127 | 9/1987 | Stich et al. | 360/78.06 X |
| 5,153,787 | 10/1992 | Sidman | 360/77.05 |
| 5,402,400 | 3/1995 | Hamada et al. | 360/75 X |

FOREIGN PATENT DOCUMENTS 4-219801  8/1992  Japan.

Primary Examiner—Aristotelis Psitos
Assistant Examiner—Patrick Wamsley
Attorney, Agent, or Firm—Sughrue, Mion, Zinn, Macpeak & Seas

[57] ABSTRACT

A control system rotates disks as information storage media to position a head in a disk drive that records or reproduces data. An actuator swings the head in the radial direction of the disk. Positioning of the head is performed by a servo control system adjusting a drive current supplied to the actuator based on the value of the drive current and head position information. Parameters for the actuator are estimated based on the head position information and the value of the drive current obtained when the head is vibrated at one or more frequencies in a plurality of positions. The estimated parameters are used to adjust input/output signals for the servo control system to correct the preset parameters for the control system.

12 Claims, 7 Drawing Sheets

CONTROL SYSTEM FOR POSITIONING HEAD IN DISK DEVICE BY ESTIMATING AND CORRECTING ACTUATOR PARAMETERS BASED ON HEAD POSITION AND ACTUATOR DRIVE CURRENT OBTAINED BY VIBRATING THE HEAD

FIELD OF THE INVENTION

The present invention relates to a control system for a disk device and in particular to a head control system for moving and positioning a head.

BACKGROUND OF THE INVENTION

Today, magnetic disk drives, and in particular hard disk drives, are essential peripheral devices as external storage devices for computers. In the field of personal computers, those with a small size and a large capacity are widely used.

A magnetic disk drive is in general a component integrally incorporating a plurality of magnetic disks, a disk rotation mechanism, a recording/reproduction head, and a head positioning servo mechanism. It uses the disk rotation mechanism to rotate the plurality of magnetic disks at a high speed, and moves the recording/reproduction head in the radial direction above the disk to reach a target track for recording or reproduction.

The head is provided at the tip of a head arm that is swung by an actuator around a rotation shaft. The actuator is controlled by a servo system to perform head seeking and target track following operations. A recording-reproduction-separated head that is a combination of an MR (magnetoresistive effect) head for reproduction and a thin film inductive head for recording is used as the recording/reproduction head.

Head control for such a magnetic disk drive generally has speed control and position follow-up modes. In the speed control mode, a speed profile (reference speed pattern) is generated according to the difference between a position of the head and the target position. A drive current in proportion to the difference between the speed profile and head speed is supplied to the actuator to match the head speed with the speed profile, allowing the head to move to the target track at a high speed. In the position follow-up mode, a control signal in proportion to the difference between the position of the head and the target position, and a control signal in proportion to the head speed are used to drive the actuator to control the head so that it will not deviate from the target track.

Such a proportional gain set for each head control mode is determined by the design values of the actuator. However, since dynamic parameters vary from one actuator and another, the gain is eventually adjusted and determined before shipment. For the position follow-up mode, an automatic gain controller has been proposed to maintain the loop gain constant by measuring the loop gain for the entire closed loop (Japanese patent unexamined publication No. 4-219801).

In addition, the disk drive requires a servo device to suppress the vibration of the head caused by the resonance of a head arm, a carriage, disks, etc.

In a disk drive employing an observer in a control system, however, if actuator parameters vary due to temperature changes or the characteristics of each actuator, attempts to compensate the variations with the automatic adjustment of the loop gain do not result in sufficient compensation for the servo characteristics because these parameters are built into in the observer.

In addition, if parameter variations due to the characteristics of the actuator are eventually adjusted before shipment, it is difficult to compensate variations due to secular changes.

With the automatic loop gain control device (the unexamined publication No. 4-219801), gain adjustment for the observer is difficult because loop gain adjustment depends solely upon output gain adjustment. Particularly, varying actuator parameters affect the speed profile following characteristics of the head in speed control mode and the automatic loop gain control device cannot eliminate this effect.

Furthermore, a disk drive that digitally controls the head is subject to alias noise as well as lost bits. To reduce the effect of alias noise, a detected positional error signal is conventionally used as an error control signal after it is caused to pass through an anti-alias filter or a lowpass filter. This prevents the generation of positional error signals for control if the head moves at a high speed and the high-frequency components in the positional error signals increase.

It is an object of the present invention to provide a control system that can stabilize the servo characteristics of a disk drive even when there are variations and secular changes in parameters for an actuator that moves a head.

It is another object of this invention to provide a control system that can detect positional error signals well to precisely control head positioning even when the head is moving at a high speed, such as in access operation.

SUMMARY OF THE INVENTION

The present invention is a control system for positioning a head in a disk drive which rotates disks to perform at least data reproduction, particularly a head control system which can estimate parameters for an actuator that moves a head and use them to compensate parameters preset by a control system accordingly, thereby allowing servo characteristics to be kept stable even if the actuator parameters vary due to the characteristics of the actuator or secular changes.

The control system for controlling the actuator for moving said head in the substantially radial direction of said disks is comprised of: a positional information generator for generating positional information representing the position of the head on the disks; a servo controller for controlling a drive current to the actuator so that the position of the head can match a given target position on the basis of the preset parameters for the actuator, the detected value of a drive current supplied to the actuator, and the head position information; a parameter estimation circuit for estimating current parameters of the actuator, based on the value of the drive current supplied to the actuator and the positional information obtained by vibrating said head at one or more predetermined frequencies in one or more predetermined positions on the disks; and a parameter correction circuit for correcting the preset parameters in the servo controller by using the estimated parameters.

The parameter estimation circuit is preferably comprised of: a reference wave generator for generating reference waves with one or more predetermined frequencies; a superposing circuit for superposing the reference waves on a control signal generated by the servo controller with the head located at one or more predetermined head positions; and a calculator for calculating the current parameters of the actuator by discrete Fourier transformation using the detected value of the drive current supplied to the actuator, the head position information obtained by the positional information generator, and the reference waves.

The parameter correction circuit is preferably comprised of: a multiplier for multiplying the detected drive current value to be inputted to the servo controller by the estimated parameter; and a divider for dividing a control signal outputted from the servo controller by the estimated parameter.

The control system for controlling the actuator for moving said head in the substantially radial direction of said disks is comprised of: a positional information generator for generating positional signals representing the position of the head, based on servo data read out from the disks by the head; a switch for selecting one among the positional signals before passing a lowpass filter or anti-alias filter and the positional signals after passing the lowpass filter, depending on the dynamic state of the head; a servo controller for controlling a drive current to the actuator so that the position of the head can match a given target position on the basis of the preset parameters for the actuator, the detected value of a drive current supplied to the actuator, and the selected positional signals; a parameter estimation circuit for estimating current parameters of the actuator, based on the value of the drive current supplied to the actuator and the selected one of the positional signals obtained by vibrating the head at one or more predetermined frequencies in one or more predetermined positions on the disks; and a parameter correction circuit for correcting the preset parameters in the servo controller by using the estimated parameters.

Preferably, the switch selects the positional signals before passing the lowpass filter when the head exists without a predetermined distance from the target position or the head speed is greater than a predetermined valise, and selects the positional signals after passing said lowpass filter when the head exists within the predetermined distance or the head speed is smaller than said predetermined value.

DETAILED DESCRIPTION OF THE PREFERRED EMBODIMENTS

An embodiment according to this invention is explained in detail below with reference to the drawings.

Figure 1:
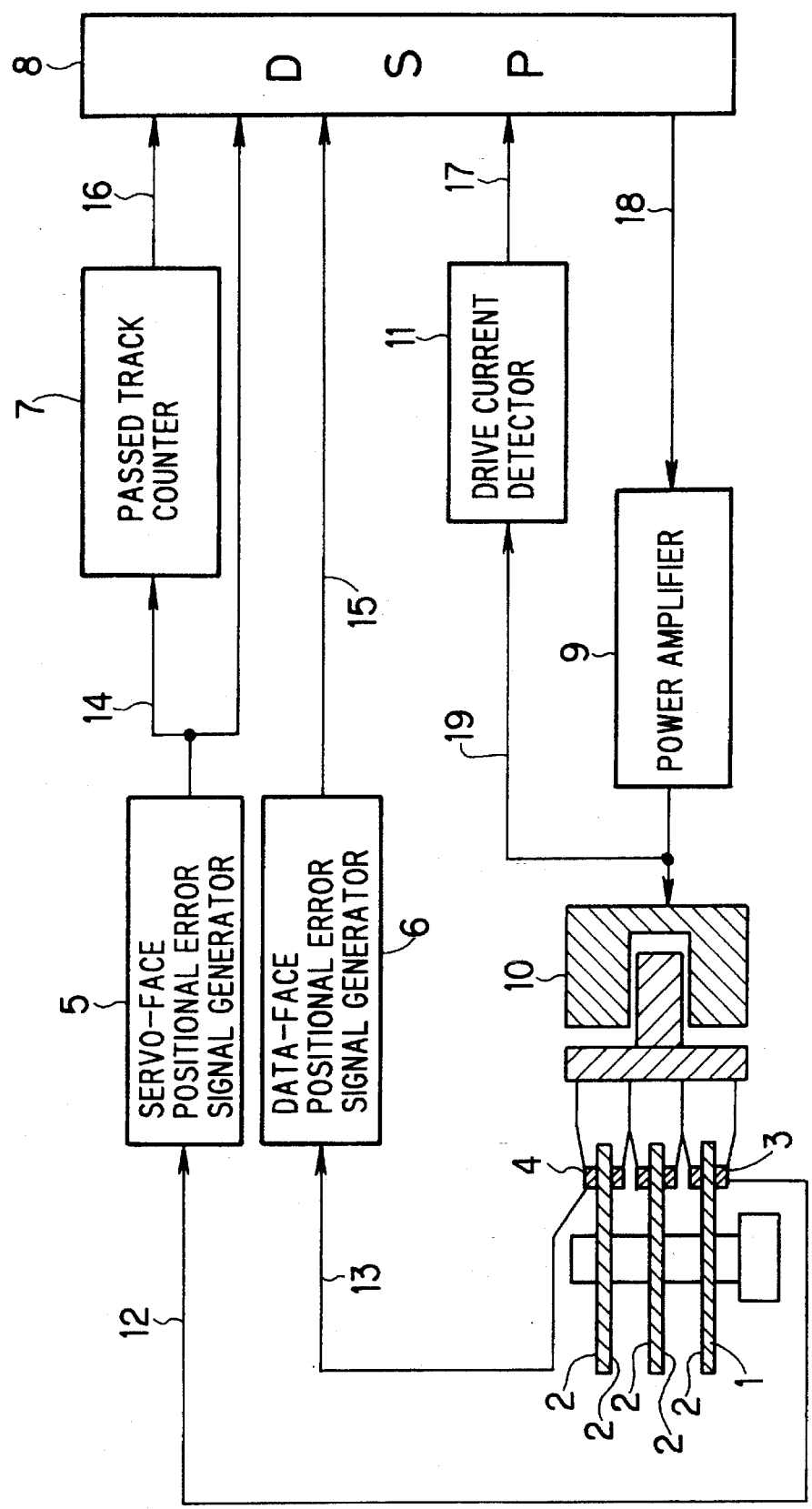
FIG. 1 is a schematic block diagram illustrating the control system of a magnetic disk drive.

FIG. 1 is a block diagram illustrating the control system of a magnetic disk drive. The magnetic disk drive has a mechanism wherein, for example, three magnetic disks rotate around a spindle. These magnetic disks have thereon one servo face 1 and five data faces 2.

Servo data are written in advance into the servo face 1 using the Servo Track Writer (STW). The servo-face servo data 12 are read by a servo head 3 and input to a servo-face positional error signal generator 5, which generates servo-face positional error signals 14 (see FIG. 2).

A recording-reproduction-separated head 4 records or reproduces data on or from the data face 2. As described below, however, servo data are also written into the data faces 2 and this data-face servo data 13 are read by the head 4. The data-face servo data 13 are inputted to a data-face positional error generator 6, which generates data-face positional error signal 15 (see FIG. 4).

A passed track counter 7 uses the servo-face positional error signal 14 to output its count 16 indicating the number of tracks passed to a digital signal processor (DSP) 8 while the head is moving.

The servo-face positional error signal 14 and data-face positional error signal 15 are input to the DSP 8, which then generates a hybrid positional error signal. This will be explained later referring to FIG. 6.

A current detector 11 detects a drive current 19 when a power amplifier 9 drives the actuator 10, and the DSP 8 uses the detected current value 17 and the positional error signals described above to perform speed and position follow-up controls, and parameter estimation and correction. These operations will be described in detail later referring to FIG. 7. This constitution allows the heads 3 and 4 moved by the actuator 10 to be controlled stably.

As described above, the resonance component of the mechanism including the actuator 10 is superposed on the servo-face positional error signal 14 and data-face positional error signal 15 generated from the servo data 12 and 13 read by the heads 3 and 4.

In addition, the servo-face positional error signal 14, the data-face positional error signal 15, and a detection signal 17 from the current detector 11 are outputted as digital signals after conversion.

Figure 2:
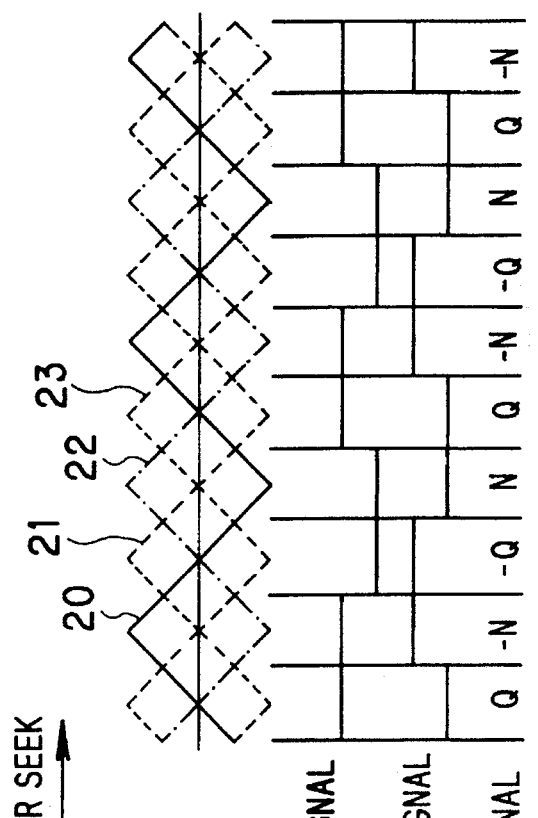
FIG. 2 is a waveform for a servo-face positional error signal 14 and a comparison signal therefor.

FIG. 2 shows a wave form chart for the servo-face positional error signal 14. The servo-face positional error signal 14 is a triangular wave with a cycle corresponding to four tracks as well as two phases that are at 90 degrees to each other, and consists of an N-position signal 2 and a Q-position signal 21. When the head is moved in the inner direction, the Q-position signal 21 follows the N-position signal 20 with a delay of 90 degrees.

Figure 3:
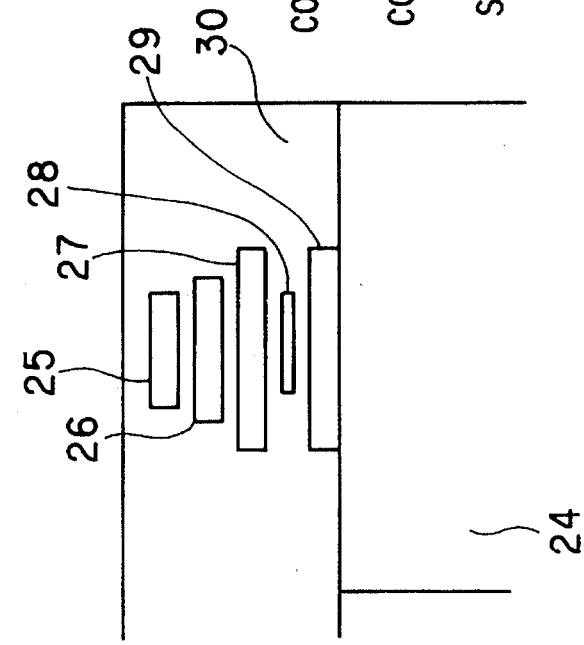
FIG. 3 is a schematic sectional view of a recording-reproduction-separated head.

FIG. 3 is a schematic sectional view illustrating the configuration of the recording-reproduction-separated head 4. It has thin film inductive heads 25 and 26 as data recording heads and an MR (magnetoresistive effect) head 28 as a data reproduction head which is provided between magnetic interference prevention shields 27 and 29. The thin film inductive heads 25, 26 and the MR head 28 are integrated and bonded to one side of a slider 24, and are protected by a protect film 30 for preventing the degradation and crash of the heads.

Figure 4:
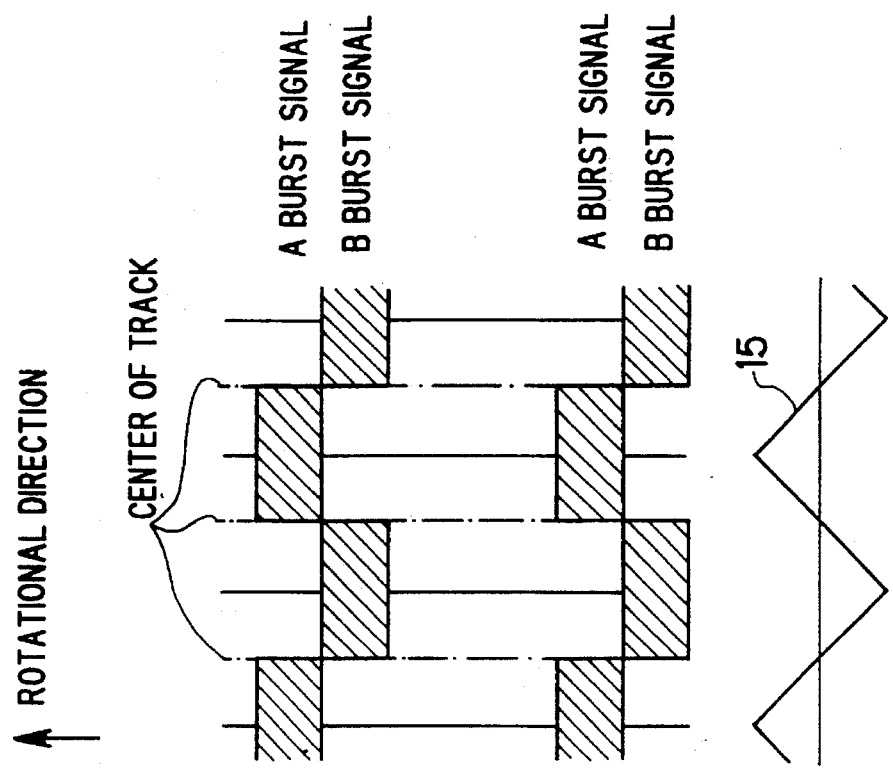
FIG. 4 is a waveform for servo data and a data-face positional error signal 15 written into a data face.

In addition to the servo-face servo data 12, the data-face servo data 13 are used to reduce the effect of off-tracking in each disk and head. The data-face servo data 13 are written as shown in FIG. 4. Specifically, half-track offset mode causes the data recording head to follow the servo track with shifting by ½ track and to write as data-face servo data 13, A and B burst signals into the data face in every other track.

During reproduction, the data-face servo data 13 are read by the head 4 and the data-face positional error signal generator 6 uses the difference between the gains of the A and B burst signals to generate a triangular wave with a cycle corresponding to two tracks, as the data-face positional error signal 15. Both the servo head 3 and the recording-reproduction-separated head 4 are moved by the same actuator 10 comprising the rotary voice coil motor (VCM).

It is desirable that for data recording and reproduction, only the data-face positional error signal 15 be used to determine the position of the head. However, if much data-face servo data 13 is written, the amount of data on the data faces 2 is reduced. Therefore, methods combining the data-face positional error signal 13 with the servo-face positional error signal 14 to generate a hybrid positional error signal have been adopted. Among them is a frequency division method. This method is described below with reference to FIG. 6.

Figure 6:
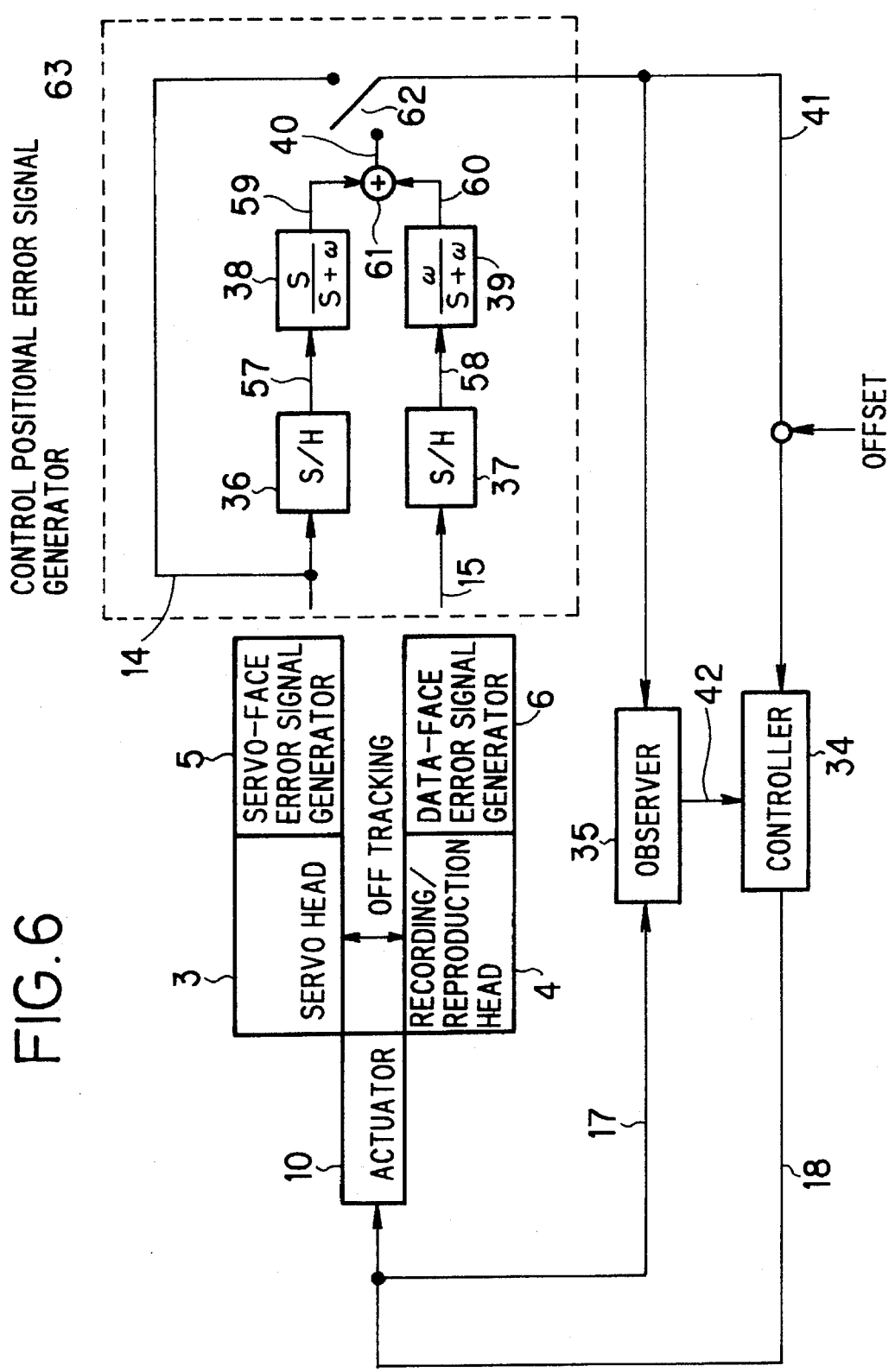
FIG. 6 is a functional block diagram illustrating a frequency division hybrid positional error signal generation method.

In FIG. 6, the actuator 10, the servo head 3, the recording-reproduction-separated head 4, the servo-face positional signal generator 5, and the data-face positional error signal generator 6 are identical to those shown in FIG. 1 but are simplified. In addition, a control positional error signal generator 63 is provided in the digital signal processor (DSP) 8 of FIG. 1 as described below.

Figure 7:
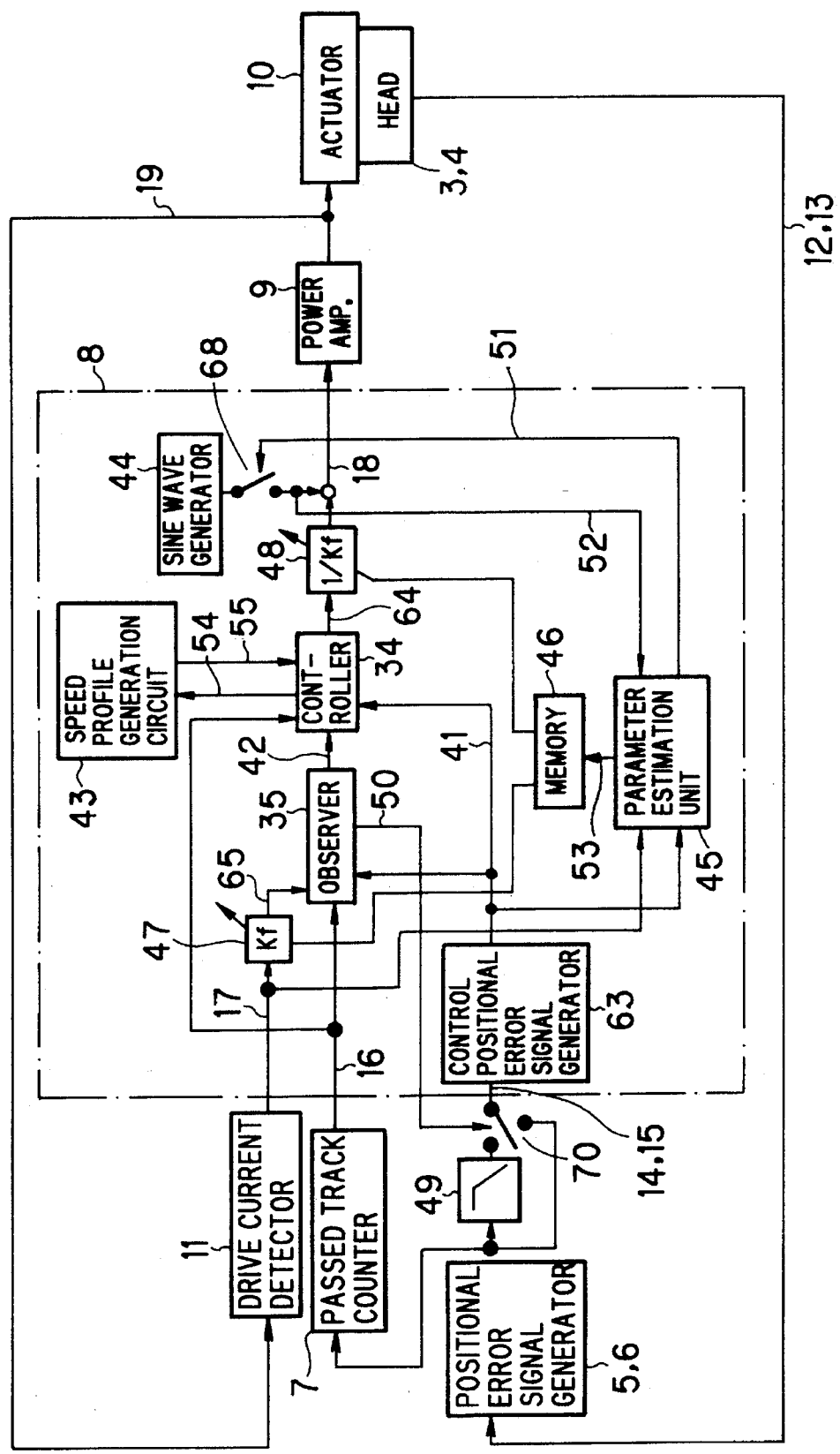
FIG. 7 is a block diagram illustrating a servo device that is an embodiment according to the present invention.

It should be noted that FIG. 6 is a functional diagram showing a method for generating frequency division hybrid positional error signals, and that, in this embodiment, a circuit consisting of an anti-alias filter and a switch is provided in the front stage of the control positional error signal generator 63 as explained in FIG. 7.

In the control positional error signal generator 63 in FIG. 6, the servo-face positional error signal 14 and the data-face positional error signal 15 are sampled and held by sample and hold circuits 36 and 37, and the outputs 57 and 58 are input to a highpass filter 38 and a lowpass filter 39, respectively. Signals 59 and 60 output from the highpass filter 38 and the lowpass filter 39 are added together by an adder 61 to generate a hybrid positional error signal 40. Either the hybrid positional error signal 40 or servo-face positional error signal 14 is selected by the switch 62 and outputted as a control positional error signal 41.

The switch timing for the switch 62 depends upon the moving speed of the head 4. That is, if the head is moving fast, the reliability of the data-face positional error signal 15 becomes very low and the servo-face positional error signal 14 must be selected as a control positional error signal 41 instead of the hybrid positional error signal 40.

Using the control positional error signal 41 obtained in this manner, a controller 34 and an observer 35 perform the control according to the present invention as described below.

FIG. 7 illustrates an embodiment of a servo device according to this invention. This embodiment is a magnetic disk drive to which this invention is applied and the control positional error signal 41 is generated using a frequency division method as shown in FIG. 6.

The positional error signal generators 5 and 6 in FIG. 7 refer to the servo-face positional error signal generator 5 and the data-face positional error signal generator 6, and are represented as one block. Therefore, there are two circuits composed of an anti-alias filter 49 and a switch 70 and the circuits are connected to the servo-face positional error signal generator 5 and the data-face positional error signal generator 6, respectively. The control positional error signal generator 63 is as explained in FIG. 6.

First, input and output signals for the DSP 8 are described. The servo-face positional error signal 14, the data-face positional error signal 15, and the detection signal 17 detected by the current detector 11 are converted to digital signals, which are then inputted to the DSP 8.

The anti-alias filter 49 is a lowpass filter that has a cutoff frequency of twice the sampling frequency, and reduces alias noises in the servo-face positional error signal 14 and the data-face positional error signal 15 after they are converted to digital signals.

However, if the head is moving at a high speed, the anti-alias filter 49 compresses the positional error signals 14, 15. Thus, in speed control mode, the positional error signals 14, 15 are used before passing the anti-alias filter 49. While in the position settling and following modes, the positional error signals 14, 15 are used after passing the filter 49. In addition, the detection signal 17 is virtually saturated when the head is accelerated but has a much smaller value in position follow-up mode. Therefore, the current detector 11 that detects the actuator drive current 19 requires a very wide range. The current detector 11 thus switches the bit range between the speed control mode and the position following mode. After loading A/D converted values, the DSP 8 internally expands their lower bits in consideration of the effect of operational errors.

In addition to the above signals, signals taken in the DSP 8 include external instruction commands, the count 16 of the number of passed track generated by a passed track counter 7 from the servo-face positional error signal 14, and a comparison signal for two-phase positional error signals shown in FIG. 2. The comparison signal is used in the speed control mode to select between the positional error signals.

Head Speed Estimation

The controller 34 and the observer 35 perform control in three modes: speed control, position settling, and position follow-up. The controller 34 requires a head speed in each mode but the magnetic disk drive does not allow the direct detection of the head speed. Thus, the drive current detection signal 17, the count 16 of the number of passed tracks, and the control positional error signal 41 are inputted to the observer 35, which determines the position of the head to estimate the head speed. Methods for determining the position of the head vary according to control modes and are therefore described in conjunction to individual control modes.

The observer 35 has a two-stage configuration to reduce the effect of the resonance component superposed on the control positional error signal 41. The first-stage observer inputs the drive current value 17, the count 16 of the number of passed tracks, and the control positional error signal 41 to estimate the head speed, and the second-stage observer then uses the first estimated value and the drive current value 17 to estimate the final head speed.

The observer 35 recognizes as a disturbance and estimates the effect of the spring element of a flexible print cable (FPC) connected to the actuator 10 as well as a magnet or spring that serves to move the head to the innermost circumferential side. The observer 35 uses an actuator model to calculate a disturbance estimated value assuming that the disturbance joins the drive current for the actuator 10 as a step input. The disturbance estimated value is subtracted from a control signal 18 that is the output of the DSP 8 to cancel the effect of the disturbance.

It should be noted that the output 42 of the observer 35 in FIG. 7 includes the head speed and the disturbance estimated values.

Speed Control Mode

In the speed control mode, the actuator 10 is driven based on the difference between a target speed profile 55 and the speed estimated value 42 and moves the heads 3 and 4 to the target tracks. The target speed profile 55 is generated by a speed profile generator 43 in response to a speed profile generation instruction 54 from the control unit 34.

In the speed control mode, the observer 35 uses as positional information the head position determined based on the count 16 of the number of passed tracks and the servo-face positional error signal 14 selected depending upon a combination of comparison signals for the positional error signals.

As an example of the speed profile generation circuit 43, the target speed profile 55 is expanded on memory in advance. If an inexpensive memory with a smaller number of bits is used for the speed profile, the bit range is changed depending upon the target speed profile value before the speed profile is expanded, and when the speed profile is loaded, the bits are shifted to reduce the effect of lost bits in the speed profile value.

As an example of the target speed profile 55, the head speed is specified such that the head achieves the maximum speed when accelerated, then maintains a constant speed, and reduces its speed in proportion to the square root of the remaining distance when decelerated. This speed profile generation method allows the speed profile to be loaded with a small number of steps because the remaining distance and the addresses of the speed profile can be correlated.

Bang-bang control by feed-forward is used to reduce the access time for the one-cylinder access operation in the speed control mode.

Position Settling Mode

The position settling mode is a control mode that replaces the speed control mode when the head approaches within a specified distance from the center of the target track or when the value of the head speed becomes smaller than the specified value. In the position settling mode, settling operation is performed by PD or PID control. In the PD control, a proportional item in proportion to the positional difference between the head and the center of the target track as well as a differential item in proportion to the speed estimated value 42 determined by the observer 35 are used, while in PID control, an integral item that is an integral of the positional errors is used in addition to the preceding two items. The initial value of the integral item must be the final value of the last following operation, that is, the value when the speed control mode is entered.

In the position settling mode, the observer 35 uses the positional information generated from only the positional error signal 40 determined by the number of the target tracks. The internal conflict of the observer 35 caused by the switching of positional information is corrected by removing the number of passed tracks for the estimated position.

Position Follow-up Mode

The position follow-up mode is a control mode that replaces the position settling mode after a certain time and is controlled by the same system as the position settling mode. However, the position settling mode uses a gain focusing on a quick response to execute proper settling operation while the position follow-up mode uses a gain focusing on the compression rate to execute proper following operation.

In each of the above control modes, the second-stage observer is used to reduce the effect of the resonance of the actuator 10. However, to directly reduce the effect of resonance, control outputs to the actuator 10 may be made to pass a digital notch filter to reduce the signal outputs of the resonance frequency before outputting from the DSP 8.

The actuator parameters, however, may vary in accordance with temperature changes, the position of the head and so on, resulting in an excess response in the position settling mode or the like. Therefore, parameters estimation and correction are required.

Parameter Estimation

Estimation of parameters of the actuator 10 is performed by a parameter estimation unit 45 in the following procedure.

1) Since the parameters for the actuator 10 vary according to the positions of the heads 3 and 4, the controller 34 drives the actuator 10 to move the heads 3 and 4 to positions where measurements are desired and to make them perform following operation.

2) The parameter estimation unit 45 then outputs a parameter estimation start instruction 51 and closes a switch 68. This causes a reference sine wave signal 52 with a specified frequency generated by a sine wave generator 44 to join control outputs 64 from the controller 34 via the switch 68, resulting in generation of a DSP control signal 18. According to the control signal 18 that contains a sine wave component, the power amplifier 9 drives the actuator 10 to vibrate the heads 3 and 4 at the specified frequency.

3) The drive current detection signal 17 for several cycles at the specified frequency, the control positional error signal 41 generated by the vibrating heads 3 and 4, and the reference sine wave signal 52 are inputted to the parameter estimation unit 45, which performs the discrete Fourier transformation to calculate the input/output gains of the actuator 10. Taking the ratio of the input/output gains provides a parameter estimated value 53 for the specified frequency, which is then stored in memory 46.

To reduce the effect of eccentricity, it is desirable to select the frequency of the reference sine wave signal 52 while avoiding the rotational frequency of the disk. The period of the reference since wave signal 52 is determined to be integer times of the sampling period of the DSP 8. To remove the effect of noise around a specific frequency, it is also desirable to carry out similar measurements at different frequencies so as to take an average of these values. To generate reference sine waves for this purpose, an integral multiple of frequencies is generated by selectively reading the values from a sine wave table in a reference sine wave signal generator 44.

Parameter Correction

The parameter correction is performed by a multiplier 47 and a divider 48 using the estimated parameter value Kf for the actuator 10 stored in a memory 46. That is, the drive current value 17 detected by the current detector 11 is multiplied by the parameter estimated value Kf and the result 65 is inputted to the observer 35. Thus, in the head speed estimation, the disturbance estimation, and the operation in each mode described above, the observer 35 uses as a drive current detection value a signal 65 that is a multiple of a drive current value and a parameter estimated value Kf. In addition, the control output of the control unit 34 is divided by the parameter estimated value Kf and the result is outputted to the power amplifier 9 as a DSP control signal 18 to control the operation of the actuator 10.

Thus, actuator parameter variations due to the characteristics of the actuator 10 or secular changes are corrected based on parameter estimated values in the memory 46 updated each time the parameter estimation is performed.

Operational Sequence of DSP 8

(1) Start-up

When the power to the disk drive is turned on and the drive receives an instruction to cause the spindle to rotate the disks, it causes the maximum current to flow through the spindle motor, which then starts rotating. Once the speed reaches 90% of the reference rotational speed, a signal from the external microcomputer which observes the rotational speed of the spindle through a Hall encoder causes the DSP 8 to start controlling the rotational speed of the spindle.

When the rotational speed of the spindle follows the reference rotational speed and the servo-PLO (Phase-locked Oscillator) is locked, the sampling frequency of the DSP 8 is switched from the clock frequency of a oscillator to the clock frequency obtained from the disk face to match the frequency of the servo signal obtained from the disk face with the frequency of servo signal input timing for the DSP 8. In other words, the DSP 8 enters into zero mode.

The zero mode is an operation mode which initializes variables and flows currents to the actuator 10 to move the heads 3 and 4 to the innermost circumference side. While the actuator 10 does not receive currents, the spring element of the FPC and the magnet cause the heads 3 and 4 to be located on the innermost circumference as described above. In the zero mode, the actuator 10 further applies pressure to the heads 3 and 4 to secure them.

Then, the control of the actuator starts in parallel to the control of the rotational speed of the spindle.

(2) Return-to-zero Operation

The return-to-zero operation is performed by moving the head to the cylinder 0. In this case, the cylinder 0 shall be where the following operation is performed in response to the -N position signal for the outermost circumference of the data region. The return-to-zero operation is described below with reference to FIG. 5.

When the DSP 8 receives a return-to-zero instruction, it switches to the speed control mode with the target speed profile set at a constant speed of 100 mm/sec or below, moves the head at the constant speed, and monitors the input of an outer guard band (OGB) signal obtained in an outer guard band region 31 outside a data region 32. It starts reducing the speed after obtaining the OGB signal. Once it completes deceleration and confirms that the head has performed following operation in a certain cylinder, it starts moving the head to the cylinder 0. In moving the head back in the speed control mode, it uses a slow speed value of 10 mm/sec or below so that a deceleration profile will not be required as a target speed profile. After it determines based on the absence of the OGB signal that the head reaches the cylinder 0, it performs following operation in response to the -N position signal and completes the return-to-zero operation to enter the command acceptance state.

(3) Parameter Estimation and Update Operations

As an initial operation, the parameters for the actuator 10 are estimated as described above and the estimated values 53 are stored in the memory 46 for updating. In this case, the number of points where parameter estimation is executed depends upon the characteristics of the actuator 10. For example, a three zone method vibrating the heads 3 and 4 on the innermost circumference, center, and outermost circumference for parameter estimation is available. Other methods performing estimation at several points and supplementing these estimated values to obtain sequential values are also available. Before parameter estimation, the head is moved in the speed control and the position settling modes using the nominal values of parameters.

(4) Access Operation

Once a parameter estimated value is thus updated, the updated value is used to perform access operation in the speed control and the position settling modes. However, the bang-bang control mentioned above is used in the speed control mode with one track access operation.

When a composite head with separate reproduction and recording heads is used, offset occurs in the center of the composite head because there is a gap between the two heads. Since the amount of offset varies according to the position of the heads, offset correction is required for the position of each head. Therefore, the amount of offset for the head is determined based on the position of the target track and the type of the head before initiating access operation, and access operation is executed according to the target position with the amount of offset considered. The amount of offset must also be considered in switching between the recording and the reproduction heads during the following operation.

However, the head information for the observer 35 must always be free from the offset regardless of the difference of the heads.

A series of operation controls by the DSP 8 has been described. The switching operation for hybrid positional error signals in each mode is described below.

Switching Operation for Positional Error Signals

As described above, the switch 62 causes the control positional error signal generator 63 shown in FIG. 6 to select either the servo-face positional error signal 14 or hybrid positional error signal 40 and outputs it as a control positional error signal 41. For example, in the speed control mode, the servo-face positional error signal 14 is used as the head position information to calculate distances and the mode switch points to generate a target speed profile 55. While in the position settling and the follow-up modes, the hybrid positional error signal 40 is used as the head position information to calculate the proportional and integral items. However, the observer 35 always uses the servo-face positional error signal 14.

Figure 5:
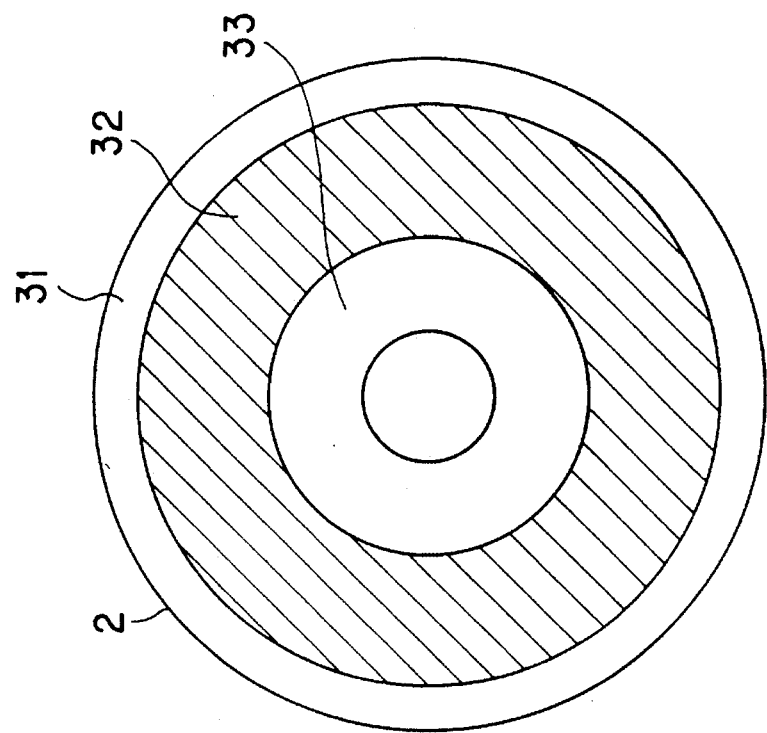
FIG. 5 illustrates a typical partitioning of the data face of the magnetic disks.

It has been noted that the frequency division method can be used as a method for generating the hybrid positional error signals in this invention but a reference servo method is also available. As shown in FIG. 5, this method writes the servo data 12, 13 into the guard band regions 31, 33 outside the data region 32 on the data face and uses the servo data to measure the amount of off-tracking on the data face 2 and the servo face 1. It then determines the amount of off-tracking in the data region 32 using the amount of off-tracking in the guard band regions 31, 33 on the inner circumferential side 31 and the outer circumferential side 33. Finally, it adds the determined amount to the servo-face positional error signal 14 to generate a hybrid positional error signal 40. Since this method allows the amount of off-tracking on each data face to be measured in advance to execute the operation using only the servo-face positional error signal 14, it does not require the switching of the hybrid positional error signal 40 and the servo-face positional error signal 14 as in the frequency division method. In addition, since the amount of off-tracking is known, the switching of the amount of off-tracking for access operation is executed similarly to the compensation for the recording-reproduction-separated head. In this method, the observer 35 always uses only the servo-face positional error signal 14 with no offset because the amount of off-tracking varies according to the position of the head.

Also, in this embodiment, the switch 70 works in such a way that the positional error signal is used before passing the anti-alias filter 49 in the speed control mode, while a similar signal is used after passing the anti-alias filter 49 in position settling and following modes.

It is also possible to execute switching based on the head speed that generates the positional error signals 14, 15 at the frequency determined by the bands of the lowpass filter that is an anti-alias filter 49. However, the head speed is determined by estimated values from the observer 35.

Figure 8:
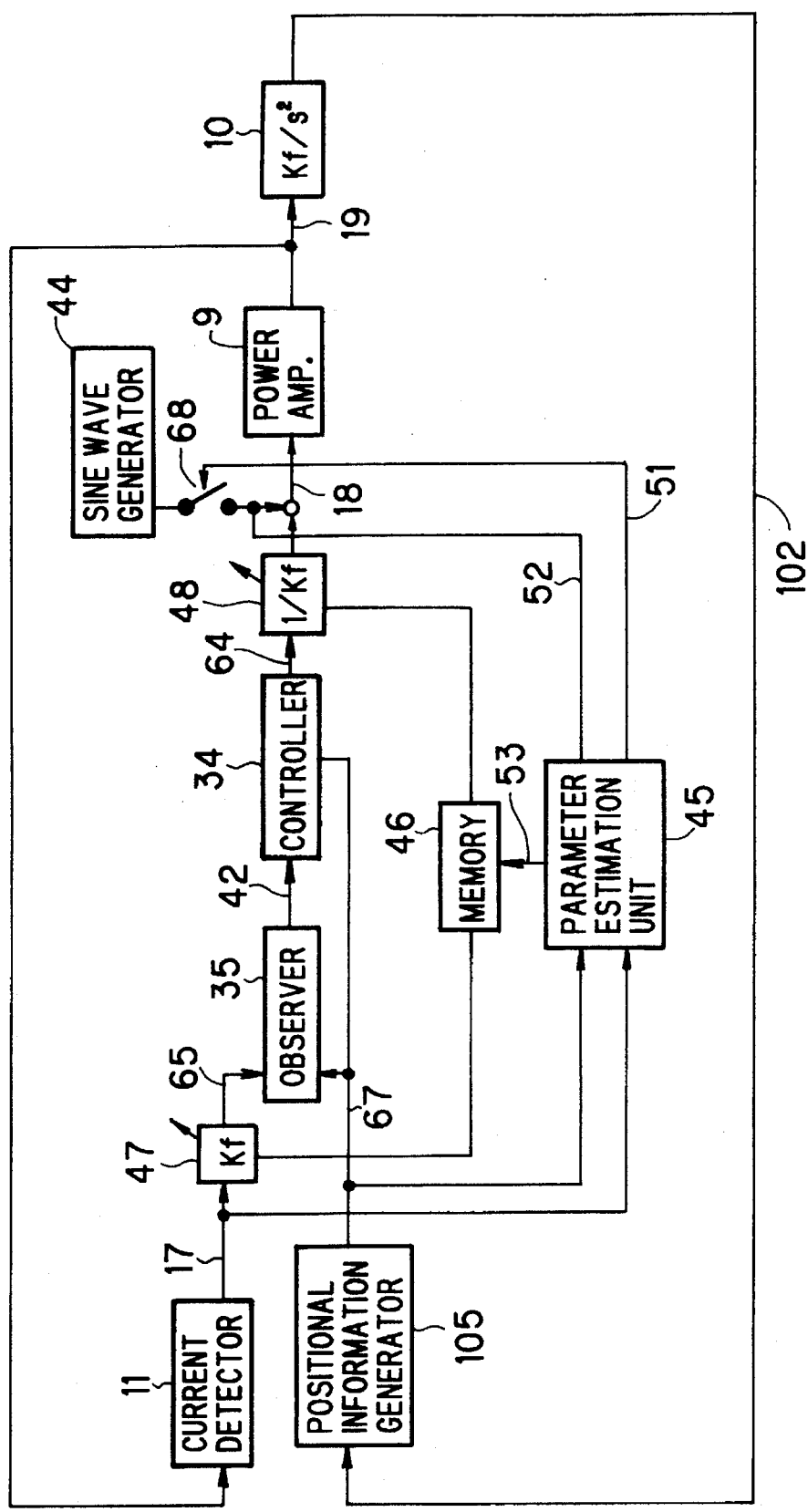
FIG. 8 is a simplified block diagram of the head control system for illustrating an actuator parameter correction method that is the embodiment of the present invention.
Figure 9:
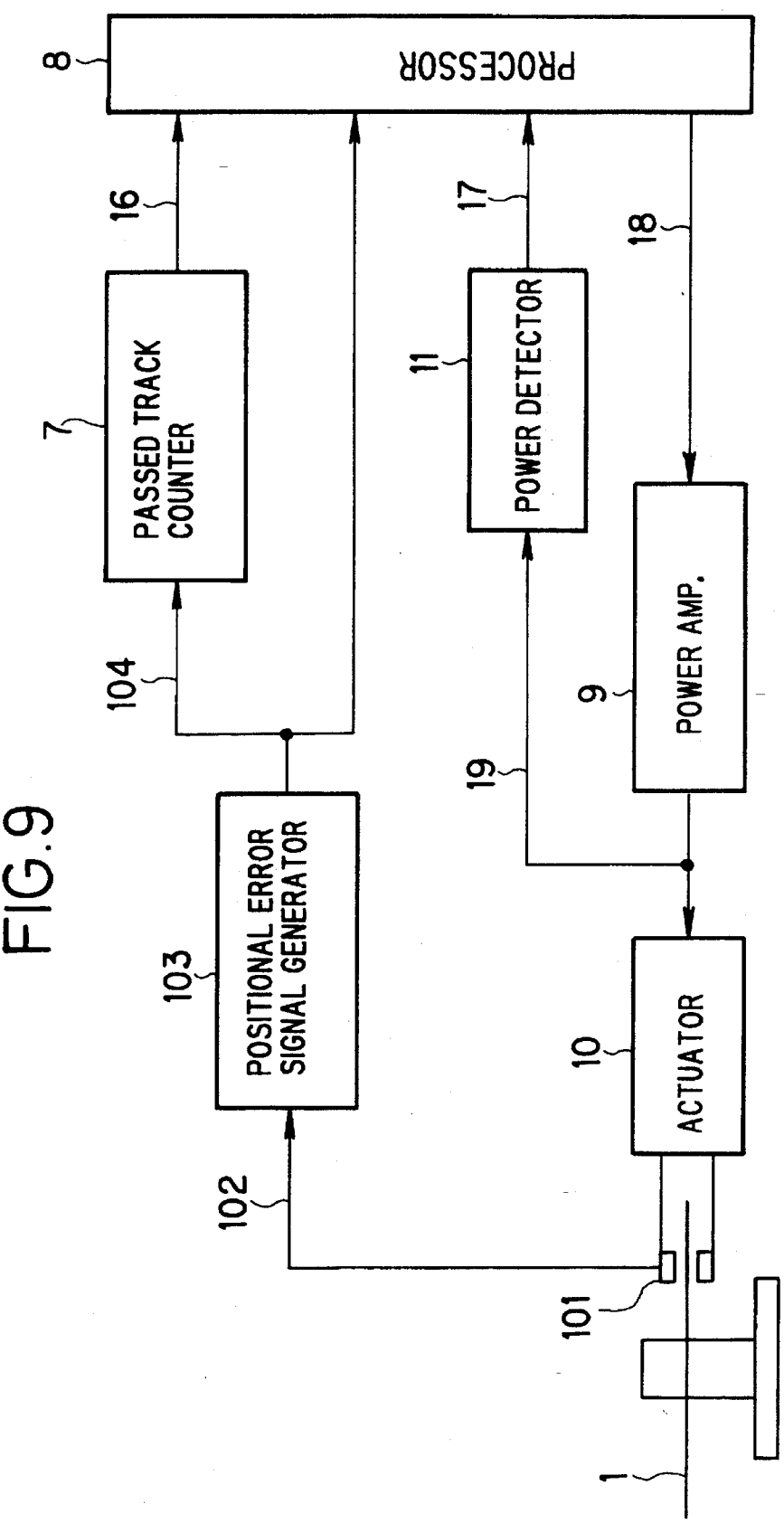
FIG. 9 is a block diagram of the overall head control system with respect to the parameter correction method.

FIG. 8 is a block diagram of the head control system illustrating the parameter correction part of the actuator 10 in this embodiment. FIG. 9 is a block diagram of the control system of the disk drive with respect to FIG. 8. The block configuration in FIG. 8 corresponds to the parameter update and correction part in the configuration of this embodiment shown in FIG. 7, and FIG. 9 is a simplified version of the configuration in FIG. 1.

In FIG. 9, a head 101 reads servo information 102 from the disk 1 and a positional error signal generator 103 generates positional error signals 104. A positional error signal generator 105 in FIG. 8 includes a positional error signal generator 103 and a passed track counter 7 and generates positional error signals 104, the number of passed tracks 16, and head position information 67. Parameter estimation and correction operations have already been described.

As described above, the head control system according to this invention can estimate parameters for the actuator that drives the head and use them accordingly to correct the preset parameters for the control system. Therefore, even if the actuator parameters vary due to the characteristics of the actuator or temperature changes, servo characteristics can be kept stable.

In addition, the position or speed of the head can determine whether or not the head positional error signal should be made to pass the anti-alias filter (lowpass filter) before inputting to the controller, thereby allowing the position of the head to be detected precisely regardless of head control mode.

What is claimed is:

1. Control system for positioning a head in a disk drive which rotates disks to perform at least data reproduction, comprising:

an actuator for moving said head in the substantially radial direction of said disks;

positional information generating means for generating positional information representing the position of said head on said disks;

servo control means for controlling a drive current to said actuator so that the position of said head can match a given target position on the basis of the preset parameters for said actuator, the detected value of a drive current supplied to said actuator, and said head position information;

parameter estimation means for estimating current parameters of said actuator, based on the value of the drive current supplied to said actuator and said positional information obtained by vibrating said head at one or more predetermined frequencies in one or more predetermined positions on said disks; and parameter correction means for correcting said preset parameters in said servo control means by using said estimated parameters.

2. Control system as set forth in claim 1 wherein said parameter estimation means comprises:

reference wave generation means for generating reference waves with one or more predetermined frequencies;

superposing means for superposing said reference waves on a control signal generated by said servo control means with said head located in one or more predetermined head positions; and calculation means for calculating said current parameters of said actuator by discrete Fourier transformation using the detected value of said drive current supplied to said actuator, said head position information obtained by said positional information generating means, and said reference waves.

3. Control system as set forth in claim 1 wherein said parameter correction means comprises:

a multiplier for multiplying said detected drive current value to be inputted to said servo control means by said estimated parameter; and a divider for dividing a control signal outputted from said servo control means by said estimated parameter.

4. Control system as set forth in claim 1 wherein said servo control means comprises:

speed estimation means for estimating the speed of said head, based on the detected value of the drive current supplied to said actuator and said head position information; and drive control means for controlling the drive current supplied to said actuator so that the position of said head matches said target position, based on said estimated head speed and said head position information.

5. Control system as set forth in claim 4 wherein said speed estimation means comprises:

first estimation means for estimating a first speed value on the basis of said detected drive current value supplied to said actuator and said head position information; and second estimation means for estimating said head speed, based on said first speed value and said detected drive current value.

6. Control system as set forth in claim 1 wherein said actuator is comprised of a voice coil motor for rotating said head in the substantially radial direction of said disks.

7. Control system for positioning a head in a disk drive which rotates disks to perform at least data reproduction, comprising:

an actuator for moving said head in the substantially radial direction of said disks;

positional information generating means for generating positional information representing the position of said head on said disks;

servo control means for controlling a drive current to said actuator so that the position of said head can match a given target position on the basis of the detected value of a drive current supplied to said actuator and said head position information;

parameter estimation means for estimating a current dynamical parameter of said actuator, based on the value of the drive current supplied to said actuator and said positional information obtained by vibrating said head at one or more predetermined frequencies in one or more predetermined positions on said disks; and parameter correction means for correcting the loop gain of said control system in said servo control means by using said estimated parameters.

8. Control system as set forth in claim 7 wherein said parameter estimation means comprises:

reference wave generation means for generating reference waves with one or more predetermined frequencies;

superposing means for superposing said reference waves on a control signal generated by said serve control means with said head located in one or more predetermined head positions; and calculation means for calculating said current parameters of said actuator by discrete Fourier transformation using the detected value of said drive current supplied to said actuator, said head position information obtained by said positional information generating means, and said reference waves.

9. Control system as set forth in claim 7 wherein said parameter correction means comprises:

a multiplier for multiplying said detected drive current value to be inputted to said servo control means by said estimated parameter; and a divider for dividing a control signal outputted from said servo control means by said estimated parameter.

10. Control system for positioning a head in a disk drive which rotates disks to perform data recording and data reproduction, comprising:

an actuator for moving said head in the substantially radial direction of said disks;

positional information generating means for generating positional signals representing the position of said head, based on servo data read out from said disks by said head;

selection means for selecting one among said positional signals before passing a lowpass filter and said positional signals after passing said lowpass filter in accordance with the difference between said head position and said given target position;

servo control means for controlling a drive current to said actuator so that the position of said head can match a given target position on the basis of the preset parameters for said actuator, the detected value of a drive current supplied to said actuator, and said selected positional signals;

parameter estimation means for estimating current parameters of said actuator, based on the value of the drive current supplied to said actuator and the selected one of said positional signals obtained by vibrating said head at one or more predetermined frequencies in one or more predetermined positions on said disks; and parameter correction means for correcting said preset parameters in said servo control means by using said estimated parameters.

11. Control system as set forth in claim 10 wherein said selection means selects said positional signals before passing said lowpass filter while said head exists without a predetermined distance from said target position, and selects said positional signals after passing said lowpass filter while said head exists within said predetermined distance.

12. Control system as set forth in claim 10 wherein said selection means selects said positional signals before passing a lowpass filter while said head speed is greater than a predetermined value, and selects said positional signals after passing said lowpass filter while said head speed is smaller than said predetermined value.

* * * * *